US008424094B2

(12) United States Patent
Neystadt et al.

(10) Patent No.: US 8,424,094 B2
(45) Date of Patent: Apr. 16, 2013

(54) AUTOMATED COLLECTION OF FORENSIC EVIDENCE ASSOCIATED WITH A NETWORK SECURITY INCIDENT

(75) Inventors: John Neystadt, Kfar Saba (IL); Efim Hudis, Bellevue, WA (US); Yair Helman, Kefar Neter (IL); Alexandra Faynburd, Haifa (IL)

(73) Assignee: Microsoft Corporation, Redmond, WA (US)

( * ) Notice: Subject to any disclaimer, the term of this patent is extended or adjusted under 35 U.S.C. 154(b) by 1105 days.

(21) Appl. No.: 11/824,732

(22) Filed: Jun. 30, 2007

(65) Prior Publication Data

US 2008/0244694 A1      Oct. 2, 2008

Related U.S. Application Data

(60) Provisional application No. 60/909,706, filed on Apr. 2, 2007.

(51) Int. Cl.
*G06F 21/00* (2006.01)
(52) U.S. Cl.
USPC ............... 726/25; 726/5; 726/24; 713/167; 380/282; 455/410; 705/317
(58) Field of Classification Search ............... 726/1, 25
See application file for complete search history.

(56) References Cited

U.S. PATENT DOCUMENTS

| 5,983,270 | A | 11/1999 | Abraham et al. |
| 6,353,385 | B1 | 3/2002 | Molini et al. |
| 6,530,024 | B1 * | 3/2003 | Proctor ............ 726/23 |
| 6,925,443 | B1 | 8/2005 | Baggett, Jr. et al. |
| 7,028,338 | B1 | 4/2006 | Norris et al. |
| 7,065,657 | B1 | 6/2006 | Moran |

(Continued)

FOREIGN PATENT DOCUMENTS

| KR | 1020010085057 | 9/2001 |
| KR | 1020030039149 | 5/2003 |

(Continued)

OTHER PUBLICATIONS

Levine et al., "The Use of Honeynets to Detect Exploited Systems Across Large Enterprise Networks", Proceedings of the 2003 IEEE, Workshop on Information Assurance, United States Military Academy, West Point, NY Jun. 2003.*

(Continued)

*Primary Examiner* — Morshed Mehedi
(74) *Attorney, Agent, or Firm* — Mayer & Williams P.C.

(57) ABSTRACT

An automated collection of forensic evidence associated with a security incident is provided by an arrangement in which different security products called endpoints in an enterprise network are enabled for sharing security-related information over a common communication channel using an abstraction called a security assessment. A security assessment is generally configured to indicate an endpoint's understanding of a detected security incident that pertains to an object in the environment which may include users, computers, IP addresses, and website URIs (Universal Resource Identifiers). The security assessment is published by the endpoint into the channel and received by subscribing endpoints. The security assessment triggers the receiving endpoints to go into a more comprehensive or detailed mode of evidence collection. In addition, any forensic evidence having relevance to the security incident that may have already been collected prior to the detection will be marked for retention so that it is not otherwise deleted.

18 Claims, 4 Drawing Sheets

U.S. PATENT DOCUMENTS

| | | | |
|---|---|---|---|
| 7,093,294 B2 | 8/2006 | Lingafelt | |
| 7,124,438 B2 | 10/2006 | Judge et al. | |
| 7,134,141 B2 | 11/2006 | Crosbie | |
| 7,152,242 B2 | 12/2006 | Douglas | |
| 7,162,649 B1 | 1/2007 | Ide | |
| 7,174,566 B2 | 2/2007 | Yadav | |
| 7,325,252 B2* | 1/2008 | Bunker et al. | 726/25 |
| 7,346,922 B2* | 3/2008 | Miliefsky | 726/3 |
| 7,530,104 B1* | 5/2009 | Thrower et al. | 726/22 |
| 7,558,848 B1* | 7/2009 | Shokhor | 709/223 |
| 7,614,085 B2* | 11/2009 | Ben-Itzhak | 726/25 |
| 7,644,271 B1* | 1/2010 | Cherepov et al. | 713/164 |
| 7,647,622 B1* | 1/2010 | Sobel et al. | 726/1 |
| 7,661,136 B1 | 2/2010 | Spielman | |
| 7,793,338 B1* | 9/2010 | Beddoe et al. | 726/3 |
| 2003/0051163 A1 | 3/2003 | Bidaud | |
| 2003/0126449 A1 | 7/2003 | Kelly | |
| 2003/0131256 A1 | 7/2003 | Ackroyd | |
| 2003/0159069 A1 | 8/2003 | Choi | |
| 2003/0208689 A1 | 11/2003 | Garza | |
| 2004/0010709 A1* | 1/2004 | Baudoin et al. | 713/201 |
| 2004/0098623 A1 | 5/2004 | Scheidell | |
| 2004/0111643 A1* | 6/2004 | Farmer | 713/201 |
| 2004/0255167 A1* | 12/2004 | Knight | 713/201 |
| 2004/0260733 A1 | 12/2004 | Adelstein | |
| 2005/0015626 A1 | 1/2005 | Chasin | |
| 2005/0033989 A1 | 2/2005 | Poletto et al. | |
| 2005/0050318 A1 | 3/2005 | Alone et al. | |
| 2005/0080816 A1 | 4/2005 | Shipp | |
| 2005/0102534 A1* | 5/2005 | Wong | 713/201 |
| 2005/0204169 A1 | 9/2005 | Tonnesen | |
| 2005/0251570 A1 | 11/2005 | Heasman | |
| 2005/0257267 A1* | 11/2005 | Williams et al. | 726/25 |
| 2005/0268112 A1 | 12/2005 | Wang et al. | |
| 2005/0289649 A1 | 12/2005 | Mitorno | |
| 2006/0018466 A1 | 1/2006 | Adelstein et al. | |
| 2006/0031938 A1* | 2/2006 | Choi | 726/25 |
| 2006/0070130 A1 | 3/2006 | Costea | |
| 2006/0075494 A1 | 4/2006 | Bertman | |
| 2006/0123478 A1 | 6/2006 | Rehfuss | |
| 2006/0236392 A1 | 10/2006 | Thomas et al. | |
| 2006/0259968 A1 | 11/2006 | Nakakoji | |
| 2006/0265689 A1* | 11/2006 | Kuznetsov et al. | 717/117 |
| 2006/0272011 A1* | 11/2006 | Ide et al. | 726/5 |
| 2006/0294588 A1 | 12/2006 | Lahann et al. | |
| 2007/0006310 A1 | 1/2007 | Piccard | |
| 2007/0016951 A1 | 1/2007 | Piccard | |
| 2007/0028300 A1* | 2/2007 | Bishop et al. | 726/22 |
| 2007/0101440 A1 | 5/2007 | Bhatia et al. | |
| 2008/0046556 A1* | 2/2008 | Nicholls et al. | 709/224 |

FOREIGN PATENT DOCUMENTS

| | | |
|---|---|---|
| KR | 1020030057929 | 7/2007 |
| WO | 2006047163 | 5/2006 |
| WO | 2006474163 | 5/2006 |

OTHER PUBLICATIONS

Ding, Juling, "An Extended Immune-based Model for Computer Forensics", International Conference on Computer Science and Software Engineering, 2008, vol. 1, Dec. 12, 2008, pp. 1166-1169.

Beckett, et al. "Digital Forensics: Validation and Verification in a Dynamic Work Environment", IEEE Computer Society, Proceedings of the 40th Annual Hawaii International Conference on System Sciences, Jan. 2007, 10 pages.

Chandrasekaran, et al. "AVARE: Aggregated Vulnerability Assessment and Response against zero-day exploits", Performance, Computing, and Communications Conference, 2006, 25th IEEE International Conference, Apr. 10-12, 2006, 8 pages.

Zaffar et al. "Cooperative Forensics Sharing", Proceedings of the 1st international conference on Bio-inspired models of network, Information and Computing Systems Conference, 2003, vol. 275, Dec. 11, 2006, pp. 1-9.

International Search Report and Written Opinion Received for PCT Application No. PCT/US2008/065499, mailed on Apr. 16, 2009, 10 pages.

Danielsson, "A System for collection and Analysis of Forensic Evidence" Nov. 2, 2003, pp. 1-78.

Broucek, et al. "Intrusion Detection: Forensic Computing Insights arising from a Case Study. on SNORT", EICR Conference Best Paper Proceedings 2003.

Udo Payer, Realtime Intrusion—Forensics A First Prototype Implementation (based on a stack-based NIDS), Selected Papers from the TERENA Networking Conference (2004).

International Search Report from corresponding Application PCT/US2008/065501, dated Dec. 24, 2008, 3 pages.

Yousof Al-Hammadi et al., "Detecting Botnets Through Log Correlation", University of Nottingham, Nottingham UK, 2006.

Abad et al., "Log Correlation for Intrusion Detection: A Proof of Concept" National Center for Advanced Secure Systems Research 2003.

Levine et al. "The Use of Honeynets to Detect Exploited Systems Across Large Enterprise Networks", Proceedings of the 2003 IEEE, Jun. 2003.

International Search Report in corresponding PCT Application No. PCT/US2008/058189, dated Aug. 28, 2008, 3 pages.

Unknown, EMCO Network Malware Cleaner: http://www.emco.is/networkmailwarecleaner/features.html, downloaded Feb. 14, 2007.

Unknown, Norman SandBox Product Suite—area of application, http://www.norman/com/microsites/mailwareanalyzer/technolgy/37799/en, downloaded Feb. 14, 2007.

Fareed Zaffar et al., "Cooperative Forensics Sharing" In: 1st Bio-Inspired models of Network, Information and Computing Systems Conference 2003, pp. 1-9 Dec. 2006.

* cited by examiner

AUTOMATED COLLECTION OF FORENSIC EVIDENCE ASSOCIATED WITH A NETWORK SECURITY INCIDENT

STATEMENT OF RELATED APPLICATION

This application claims the benefit of U.S. Provisional Patent Application Ser. No. 60/909,706, filed Apr. 2, 2007, entitled "Distributed Enterprise Security Techniques", which is incorporated herein by reference in its entirety.

BACKGROUND

An enterprise computing environment is an organization of any size that uses computers and operates a local area network connected to the Internet. Generally, an enterprise computing environment includes a number of client computing devices and one or more servers. Various types of security products, including but not limited to firewall products, anti-malware products, intrusion detection/prevention products, reputation service products, and the like are available to protect client- and server-based operating systems and other applications of the enterprise computing environment from security threats.

One type of security threat is malware, which includes but is not limited to viruses, Trojan horses, worms, spyware, rootkits, phishing attacks, and other malicious software that generally originates from a malicious presence on the Internet, such as a hacker's Web site. One common way hackers use to compromise client computing devices is by seducing users to download and execute malware from what appear to be legitimate Web sites.

Individual security products often operate in isolation, providing localized security solutions for enterprise computing environments. Deploying and maintaining a wide variety of individual security products is generally expensive and complicated. In addition, individual security products can suffer from various performance problems such as: high rates of false-positives or false-negatives; limited use of automatic responses; overly localized responses; delayed responses; limited access to contextual data desirable to assess security threats; and static data collection policies that result in the collection or retention of too little or too much data.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An automated collection of forensic evidence associated with a security incident is provided by an arrangement in which different security products called endpoints in an enterprise network are enabled for sharing security-related information over a common communication channel using an abstraction called a security assessment. A security assessment is generally configured to indicate an endpoint's understanding of a detected security incident that pertains to an object in the environment which may include users, computers, IP addresses, and website URIs (Universal Resource Identifiers).

The security assessment is published by the endpoint into the channel and received by subscribing endpoints. The security assessment triggers the receiving endpoints to go into a more comprehensive or detailed mode of forensic evidence collection. In addition, any forensic evidence having relevance to the security incident that may have already been collected prior to the detection will be marked for retention so that it is not otherwise deleted.

The collection and retention is performed in accordance with dynamic collection and evidence retention policies. The dynamic policies take into account the objects in the environment and the context that is provided by the security assessments. The type of evidence collected, the length of the collection time, and the length of time that such evidence is retained can vary by object and/or by one or more security assessments that describe the object. In one illustrative example, forensic evidence relating to a particular object that is identified by a security assessment as being compromised will be kept longer than for other objects, and all activities of that compromised object may be logged. By comparison, forensic evidence about an object for which there is no particular suspicion will be kept for a shorter period of time, and perhaps only more limited activities will be logged.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In an enterprise computing environment, aspects of a security assessment system are configured for distributed operation in connection with various security endpoints. Security endpoints ("SEs") function as both sources and recipients of security-related information. SEs receive and share security assessments via a common communication channel.

A security assessment is defined as a tentative assignment by an SE of broader contextual meaning to information (i.e., data in some context) that is collected about an object of interest in the environment such as a computer, user, service (e.g., a website), external IP address, data, or the enterprise as a whole. The security assessment utilizes a concise vocabulary for an SE to declare that an object in the environment falls into a particular assessment category such as "compromised" or "under attack" along with the severity (e.g., low, medium, high, critical) of the detected incident.

A security assessment is tentative because it is subject to some uncertainty and is valid for a limited period of time. The tentative nature of a security assessment is reflected in two of its components: a fidelity field which expresses the level of confidence the SE has in its assignment of contextual meaning, and a time-to-live ("TTL") field which reflects the endpoint's estimate of the time period for which the security assessment is expected to be valid. Thus, for example, a security assessment may be used by an SE to declare, in light of that endpoint's current understanding of one or more security incidents, that a particular machine is compromised, with a critical level of severity, with medium fidelity, and having a TTL of 30 minutes. A variety of security assessment types may be used in any given enterprise security environment including those having for example, various combinations of assessment category and object types.

SEs are enabled with functionality to publish security assessments onto the common communication channel operating in the environment, as well as subscribe to a subset of available security assessments published by other SEs. The security assessments existing in the environment that are active (i.e., those having a TTL which indicates the assessments are still valid) function to provide a security context that gives such SE a new way to look at its own locally-available information. That is, the security context enables the SE to combine or correlate evidence from security assessments received from a variety of different sources, and across object types, in order to significantly enhance the quality of its detection of potential security incidents. The SE then makes a decision as to what local action or response is appropriate for each type of security assessment (whether received from another endpoint or internally generated by the endpoint itself) in accordance with a set of response policies. Incident detection is both efficient and cost-effective because the security context enables distributed processing of enterprise-wide information, in the form of security assessments, without the burden of sharing large amounts of raw data throughout the enterprise (most of which is completely irrelevant due to the lack of any context). SEs are further arranged to roll-back the local action upon expiration of the security assessment that prompted the local action (i.e., when the security assessment exceeds the time-to-live specified in the TTL field).

A security assessment system ("SAS") facilitates distributed management of, and response, to security incidents in an enterprise computing environment that includes a number of client computing devices and a variety of security endpoints. Aspects of the SAS are configured for operation in connection with various SEs. Typically, SEs are specialized security products such as firewall products, anti-malware products, intrusion detection/prevention products, and reputation service products. At least one SE (which may or may not be a specialized security product) is referred to as the security assessment endpoint ("SAE").

An SAE performs as a centralized audit point by subscribing to all security assessments, logging the security assessments, and also logging the local actions taken by SEs in response to security incidents in the environment. The SAE provides administrators with a comprehensive view of the history and current status of the enterprise as a whole and of each individual SE.

SEs process the collected security data using security assessment criteria to detect security incidents and identify threats to the security of the enterprise computing system, and generate time-based security assessments that identify specific security incidents. The security assessments are transmitted to other SEs via the common communication channel. SEs respond to applicable security assessments in various ways (such as by taking local action, collecting forensic evidence, and/or generating/transmitting new security data). Virtually unlimited security assessment criteria and combinations thereof (such as rules, policies, locally available security data, active security assessments, windows of time, and algorithms), which may be predetermined or determined dynamically, may be used to identify security incidents and responses thereto.

Operation of the SAS is illustrated by three exemplary scenarios. In the first scenario, the security assessment system facilitates detection of a malicious presence on either a web site or from an Internet Protocol ("IP") address that poses a threat to the enterprise computing environment or causes a security incident, for example, such as an infection of a computer by a virus. In the second scenario, the SAS facilitates the detection of a malware-compromised client computing device within the enterprise computing environment. In the third scenario, the SAS enables automatic collection of forensic evidence upon identification of a particular security incident to the enterprise computing environment.

Figure 1:
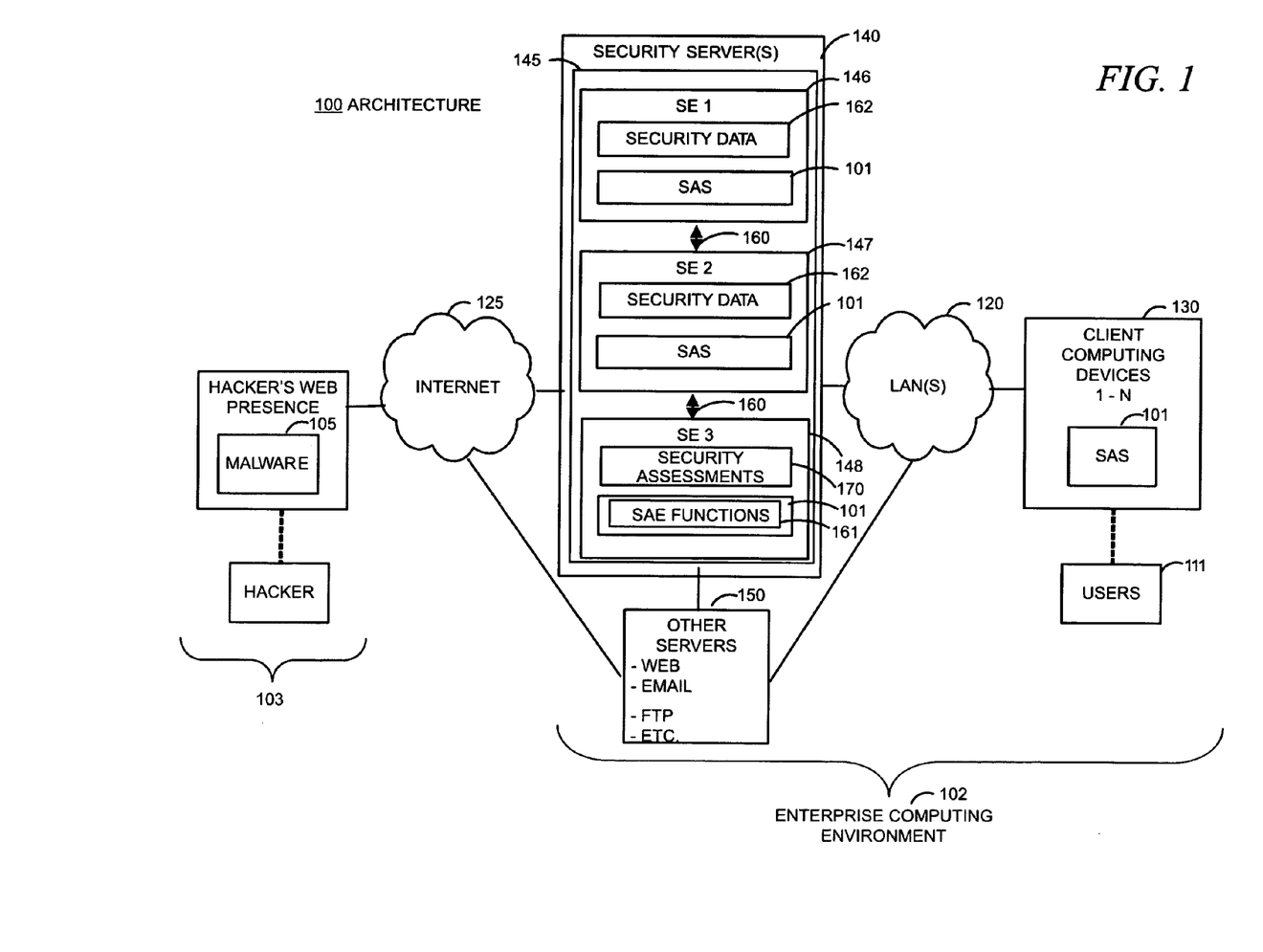
FIG. 1 is a simplified functional block diagram of an architecture for distributed security in an enterprise computing environment.

Turning to the drawings, where like numerals designate like components, FIG. 1 is a simplified block diagram of an architecture 100 that includes SAS 101 (discussed in detail in connection with FIG. 2), which facilitates distributed management of security incidents in enterprise computing environment ("ECE") 102.

Examples of security threats include but are not limited to a malicious Web site presence or IP address 103, and malware 105, which may compromise client- and server-based operating systems and other applications within ECE 102. Although malware 105 is generally depicted as originating from presence 103, malware 105 may originate from any source.

ECE 102 represents an organization of any size that uses computers and operates a local area network ("LAN") 120 connected to the Internet 125. LAN 120 is a wireless or wired network that facilitates the transmission or receipt of information within a relatively small physical area surrounding a device or an entity such as a person or a business (generally, up to a few hundred meters), using any communication protocol or technique. In one exemplary implementation, LAN 120 is an Intranet.

As shown, ECE 102 includes: a number of client computing devices 130 (1 through N devices are depicted) that optionally have access to one or more functions of SAS 101; one or more security servers 140 upon which a number of security endpoints ("SEs") 145 (three SEs are depicted, SE 1 146, SE 2 147, and SE 3 148) having access to one or more functions of SAS 101 are implemented; and one or more servers 150 upon which other functions of ECE 102 (such as Web access, email, file transfer protocol functions, etc.) are implemented. It will be appreciated that servers 140 and 150 may be the same server(s) or different servers.

Client computing devices 130 include any portable or non-portable electronic devices or components thereof that are configured for operation within LAN(s) 120 by users 111. Examples of client computing devices 130 include but are not limited to personal electronic devices such as PCs, fixed-purpose networked devices, or software applications running on general- or special/fixed-purpose computers.

SEs 145 represent any hardware, software, firmware, or combination thereof configured to protect ECE 102 from security threats. Generally, SEs function as both sources and collectors of security assessments, which are shared via a common communication channel ("CCC") 160 within LAN 120. CCC 160 is any physical or logical technology, protocol, or technique for transmitting data between computing devices. Examples of CCC 160 include but are not limited to buses, messages, data, addresses, and other devices or signals.

Certain SEs are specialized security products such as firewall products, anti-malware products, intrusion detection/prevention products, reputation service products, and the like (as shown, SE 1 146 and SE 2 147 are specialized security products). At least one SE includes the functions of a security assessment endpoint ("SAE") 161 (as shown, SE 3 includes SAE functions 161, which are discussed further in connection with FIGS. 2 and 3 below) which facilitates the centralized data logging and audit point in the ECE 102.

Figure 2:
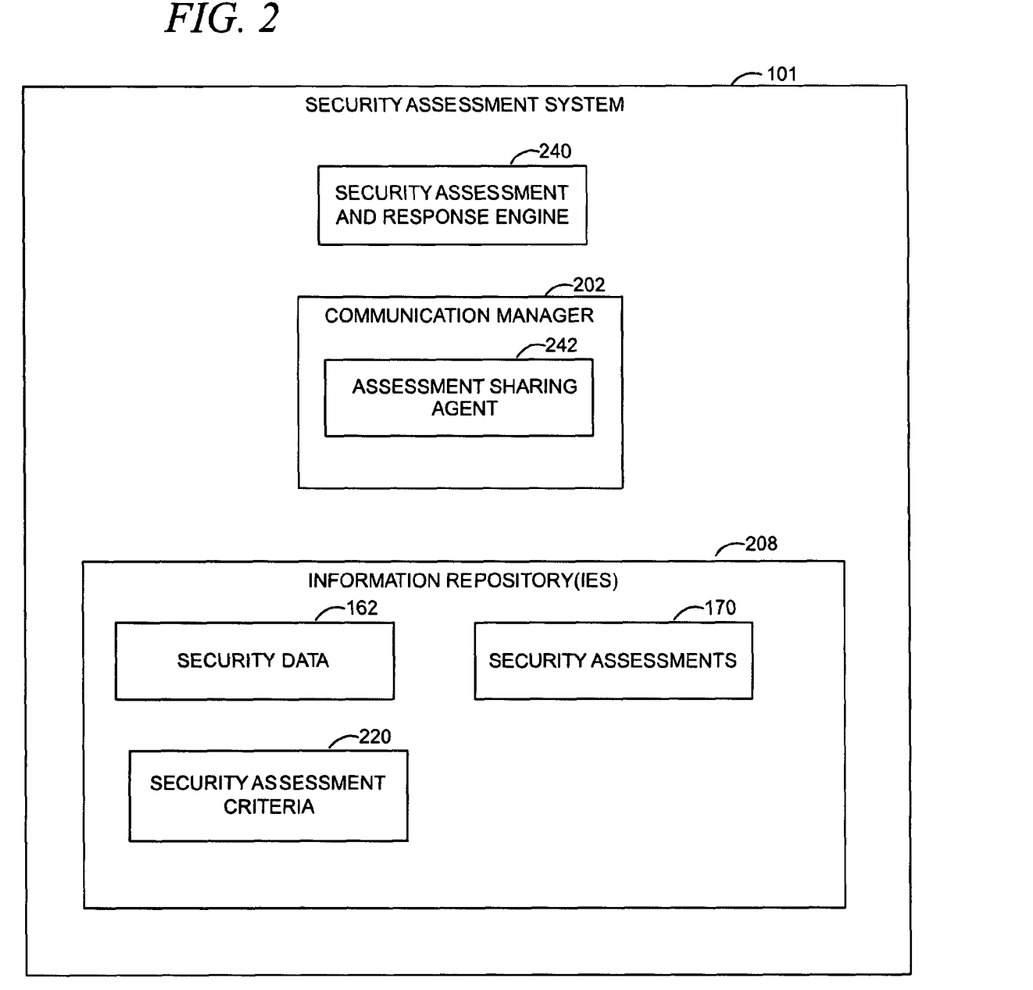
FIG. 2 is a simplified functional block diagram of the security assessment system shown in FIG. 1.

With continuing reference to FIG. 1, FIG. 2 is a simplified functional block diagram of security assessment system ("SAS") 101, aspects of which are usable with SEs 145 and/or client computing devices 130 to facilitate management of security threats in ECE 102.

SAS 101 includes: a communication manager 202; a security assessment and response engine 240; and information repository(ies) 208, which may be implemented using various types and arrangements of computer-readable media 404 (discussed further below, in connection with FIG. 4), that represent data storage capability for information relating to management of security threats within ECE 102. Information storable within information repository(ies) 208 includes but is not limited to: security data 162; security assessments 170; and security assessment criteria 220.

In general, design choices and operating environments dictate how specific functions SAS 101 are implemented. Particular configurations of SAS 101 may include fewer, more, or different components than those described. Aspects of SAS 101 may be implemented using hardware, software, or firmware, or combinations thereof. Functions of ECE 102 may operate at any layer of a communication protocol stack, such as at any layer of the well-known stack that defines internetworking: layer 1, the Physical Layer; layer 2, the Data Link Layer; layer 3, the Network Layer; layer 4, the Transport Layer; layer 5, the Session Layer; layer 6, the Presentation Layer; and layer 7, the Application Layer.

The discussion of SAS 101 begins with further details about information relating to management of security threats that is storable within information repository(ies) 208 and sharable via CCC.

Security data 162 is information in any form or format generated or collected by a particular SE 145 or client computing device 130 of ECE 102 for the purpose of identifying or responding to security threats. In one exemplary implementation, security data 162 is in the form of a data structure having predetermined fields populated by information generated by a particular SE or client computing device. It is possible for security data 162 from different sources to have disparate formats. In this case, it may be desirable to transcribe (either at the time of generation or collection) such security data 162 to a common format, to facilitate the collection, evaluation, and storage of relevant security data 162 by SAS 101 in various operating environments. Transcription of security data 162 is not discussed in detail herein.

Specialized security products 146 and 147 generate security data 162, both during normal operation and in response to security assessments 170 (discussed further below). Specific security products generate certain (often different) kinds of security data 162, which is generally periodically transmitted via CCC 160 in accordance with security assessment criteria 220 (discussed further below). For example: a firewall product generates one kind of security data 162 representing logs of attempts by client computing devices 130 to access Internet resources such as Web sites (such logs generally include records of uniform resource identifiers ("URIs") associated with the resources); an anti-malware product generates another kind of security data 162 detailing infections of particular client computing devices 130 with malware 105; and a reputation service product generates yet another kind of security data 162, which is generally information about particular malicious resources accessible via the Internet.

SE 148, that includes SAE function 161, periodically collects security data 162 transmitted via CCC 160 from various sources, and evaluates the collected security data in accordance with security assessment criteria 220 to identify security incidents. Upon identification of security incidents, SE 148/SAE function 161 transmits security assessments 170 via CCC 160. Security assessments 170 include information in any form or format transmitted for the purpose of identifying security incidents.

In one exemplary implementation, security assessments 170 are in the form of data structures having predetermined fields populated by information generated by SAE function 161.

Security assessment criteria 220 represent any information usable for decision-making regarding identification of or in response to security incidents within ECE 102. As such, security assessment criteria 220 may be used by one or more components of SAS 101 to determine: what security data 162 or security assessments 170 are generated or collected; when to generate or collect security data 162 or security assessments 170; how to evaluate and respond to collected security data 162 or security assessments 170; and/or to which devices within ECE 102 to transmit security data 162 or security assessments 170. Security assessment criteria 220 may be received from an administrator (not shown) or user 111, preprogrammed into or dynamically determined by SAS 101, communicated via CCC 160, or received from a third party (for example, a local or remote service). Virtually unlimited security assessment criteria 220 and combinations thereof are possible. For example, expressions designed to filter security data 162 or security assessments 170 based on rules, policies, statistical algorithms, locally available security data, sources, recipients, temporal references (such as times, dates, windows of time, and the like), or device-related parameters (such as available memory, processing capabilities, user identities, and the like), among other things, may be created and evaluated in connection with various functions of SAS 101.

Referring again to components of SAS 101, communication manager 202 includes one or more physical or logical elements, such as connectivity devices or computer-executable instructions, which enable intra- or inter-device communication via CCC 160. In particular, information sharing agent 242 facilitates communication of security data 162 and security assessments 170 via CCC 160 between SASs 101 located in various SEs 145 and client computing devices 130. Communication may be initiated by information sharing agent 242 in any operating environment. Data push or pull techniques may be employed. Asynchronous messaging paradigms such as "pub/sub" may be supported. It will be understood that communication manager 202/information sharing agent 242 are responsible for the receipt, transmission, and processing of information by a particular device or component thereof, as such information traverses any layer of communication protocols associated with any known or later developed communication model. An exemplary communication model is the well-known abstract model that defines internetworking.

Security assessment and response engine ("SARE") 240 is responsible for using security assessment criteria 220 to handle (generate, collect, or respond to) security data 162 and/or security assessments 170 received via CCC 160/information sharing agent 242. In the operating environment of SE 148 that includes SAE functions 161, SARE 240 is responsible for collecting and evaluating security data 162 from various sources, and generating security assessments 170. In the operating environments of specialized security products 146 and 147, SARE 240 may respond to security assessments 170 in various ways, such as by taking local action, collecting forensic evidence, and/or generating and transmitting new security data 162. Operation of SARE 240 is also discussed further below, in connection with FIG. 3.

Figure 3:
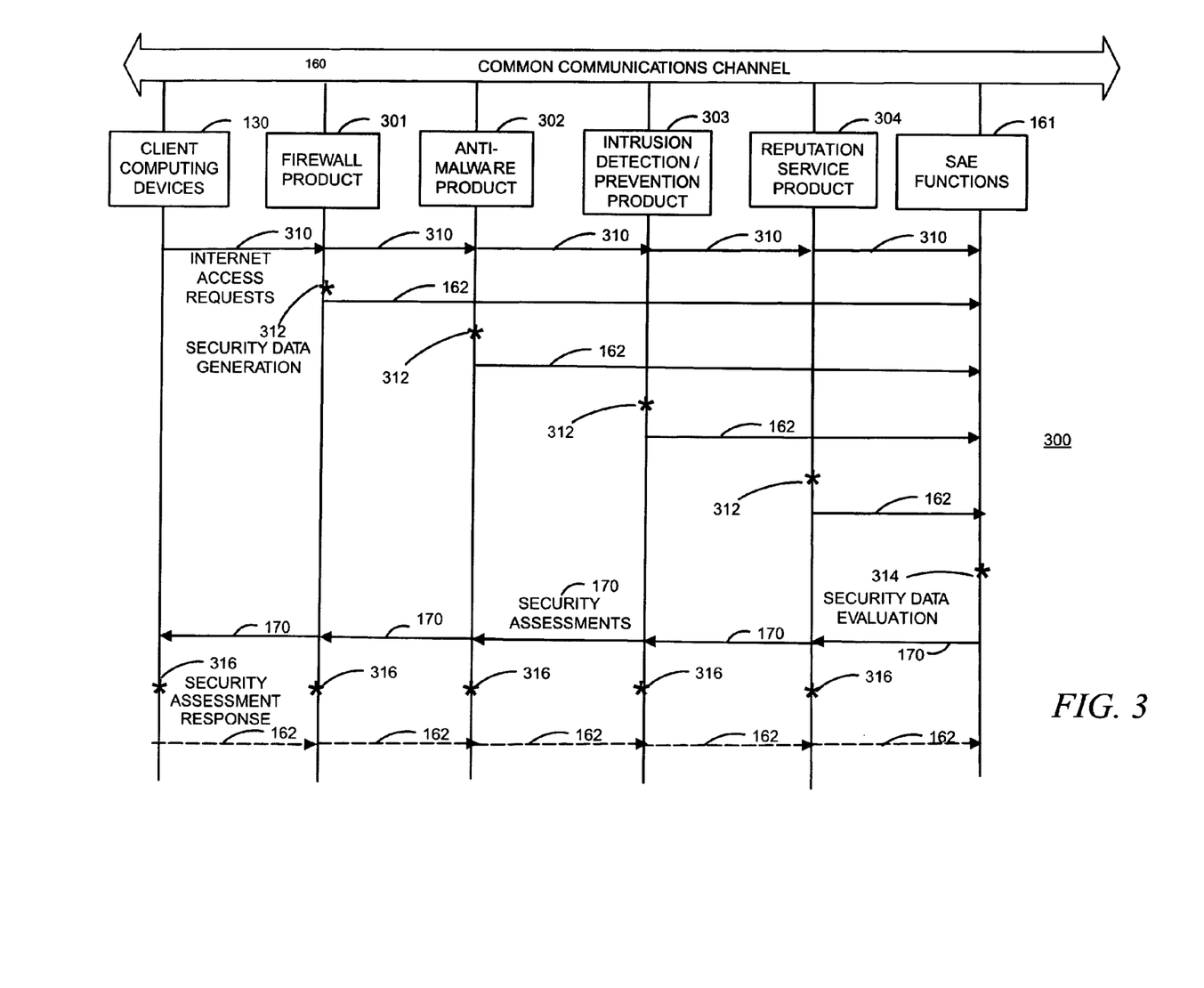
FIG. 3 is a message sequence chart illustrating certain aspects of methods for handling security threats to the enterprise computing environment shown in FIG. 1.

With continuing reference to FIGS. 1 and 2, FIG. 3 is a message sequence chart 300 illustrating certain methods for handling security incidents within an enterprise computing environment, such as ECE 102, using a distributed security assessment system, such as SAS 101. For discussion purposes, it is assumed that aspects of SAS 101 are implemented in various SEs 145, including several specialized security products, which, as shown, include a firewall product 301, an anti-malware product 302, an intrusion detection/prevention product 303, and a reputation service product 304. Aspects of SAS 101 are also implemented in an SE that includes SAE function 161. Client computing devices 130 that implement aspects of SAS 101 are also depicted. SASs 101 within ECE 102 are configured for communication via CCC 160, and it is assumed that individual information sharing agents 242 possess device addresses, port numbers, and the like, useable to accomplish the transmission and reception of the messaging described herein via CCC 160. Two exemplary security incidents are discussed—a malicious presence on the Web (or an IP address), and a malware-compromised client computing device.

Referring to the message sequence chart, Internet access requests 310 are generated by various client computing devices 130. Internet access requests 310 are any requests for access to resources (such as Web sites and other resources) accessible via the Internet or another network outside of LAN 120. Such resources generally have associated URIs. One or more security endpoints 301, 302, 303, and 304 may be configured to handle Internet access requests 310.

Security data generation asterisks 312 represent activities relating to generation of security data 162 by specialized security products 301, 302, 303, and 304 during normal operation, which is transmitted via CCC 160. Security assessment criteria 220 may be used to determine what security data 162 is generated, and when the security data is transmitted via CCC 160. Exemplary kinds of security data 162 generated during operation of various specialized security products include but are not limited to: by firewall product 301, records of URIs associated with Internet access requests 310; by anti-malware product 302, details about infections of particular client computing devices with malware 105; by intrusion detection/prevention product 303, information about intrusions into LAN 120 by malicious presence(s) 103; and by reputation service product 304, information about particular malicious resources accessible via the Internet.

Security data evaluation asterisk 314 represents activity by SAE function 161 (generally performed by SARE 240 implemented in the operating environment of SE 148) relating to the use of security assessment criteria 220 to evaluate security data 162 collected from specialized security products 301, 302, 303, and 304 via CCC 160, for the purpose of generating security assessments 170, which are also transmitted/received via CCC 160.

In the exemplary scenario of detecting a malware-compromised client computing device within ECE 102, certain security assessment criteria 220 are configured to periodically (for example, every few hours or any other desirable amount of time) identify security data 162 generated by reputation service product 304 that indicates that a particular Internet-accessible resource poses a security threat to ECE 102. It is contemplated that such threats can come from malicious web sites or IP addresses. Thus, for example, the reputation service 304 regularly produces an updated list of newly categorized malicious resources (e.g., URIs and IP addresses) which can be included, in some implementations, as part of a security assessment that is shared over the CCC 160 or otherwise communicated.

When the security assessment is received, various responses may be invoked by the receiving SEs or the SAE including, for example, raising an alert to an administrator that one or more resources have been newly categorized, triggering a scan by an anti-virus/malware detecting SE of the client computers in the ECE 102 to look generally for possible systems of infection or compromise (or look for a specific piece of malware), or quarantining or otherwise isolating one or more client computers until a more complete investigation can be completed.

A malware analyzer, which as noted above can be a standalone SE, or incorporated into an SE having anti-virus/malware detection capability, or incorporated into the reputation service, will analyze the firewall logs to identify, in a retroactive manner over some predetermined time window, those client computers or users in the ECE 102 that had any past communications with the newly categorized resource. That is, communications with a URI or IP address are examined which occurred in the past before the reputation of that URI or IP address was changed. When there is an identified past communication that matches an entry on the list from the reputation service, a security assessment is launched into the CCC 160 which will identify the client computer as being suspected of being compromised. Other SEs in the ECE 102 can then use the security assessment to thereby invoke one or more local responses as noted above.

As the methodology described above may involve the analysis of a large amount of data (depending on the size of the ECE 102, and the size of the retroactive time window selected) as well as use bandwidth to receive the reputation data, in alternative implementations, other methodologies may be employed by the malware analyzer. These include a methodology where the firewall logs are retroactively analyzed responsively to an access of a particular resource that has been identified as malicious. This could occur, for example, when a first client accessed a web site a month ago, and a second client attempt to access the same site again today. In this example, it is assumed that a reputation service has flagged the site as having a changed categorization to malicious in between the first and subsequent accesses. Thus, when the second client accesses the site, a security assessment will be generated and some response may be taken to block access, etc. In addition, the firewall log is scanned to identify all past access to that particular URI or IP address by clients or users in the ECE 102 and if identified, additional security assessments will be generated and used to trigger responses by the SEs or SAE. This methodology typically reduces the amount of log scanning and analysis that is performed, but may miss some possible suspected past access to malicious resources because the reputation data being utilized is more limited.

Another methodology that may be used in some implementations where there is some past access to a resource, but it is a single access where no other clients or users access the resource again. In such a case, there is no event by which to trigger identification of a changed categorization for the resource. In this case, it is possible to automatically send a list of such one-time accessed resources to the reputation service to verify if the reputation of that resource has changed. While this typically reduces the bandwidth that is otherwise necessary to receive lists of changed URIs and IP addresses, there may be some privacy concerns triggered by sending the identities of the particular URIs and IP addresses accessed by an ECE 102 to the reputation service. Therefore, the particular choice of methodology utilized will often be a design choice that is tailored to the particular environment or deployment of the present arrangement. In some cases, more sensitivity is obtained at the expense of more involvement by an administrator to handle alerts. In other cases, more bandwidth use will be accepted to have more complete reputation data on hand when performing a log analysis. The specific balance selected may be dynamically varied in some cases to tailor the effectiveness of the solution to a particular problem at hand.

In the exemplary scenario of detecting a malicious presence, such as presence 103 (which can include a web site or an IP address), certain security assessment criteria 220 are configured to identify security data 162 generated by anti-malware product 302 that indicates that a particular client computing device has been infected with malware 105, and to identify a time window prior to the client computing device becoming infected (for example, five minutes or another amount of time). Additional security assessment criteria 220 are configured to identify a subset of security data 162 generated by firewall product 301, such as web access logs or logs indicating communications from external IP addresses, during the identified amount of time. Further security assessment criteria 220 are used to identify one or more attempts by the infected client computing device and/or other client computing devices to access a particular URI identified by firewall product 301. For example, a URI that was accessed by a certain number of client computing devices that then became compromised may be identified and not accessed by any other client, otherwise popular resources such as news sites that are frequently accessed by all clients will be mistakenly identified as malicious (what is termed a "false positive"). One or more security assessments 170 that indicate that the identified URI represents a malicious presence on the Web can then be issued by an SE and used to raise an alert to an administrator, or trigger responses (discussed further below) by one or more specialized security products.

The particular size of the time window and the particular number of computers that needs to be compromised through common access to a resource (i.e., a website URI or IP address) before a security assessment is published or an alert generated will generally be dependent on circumstances surrounding a specific deployment of the present arrangement. For example, it is generally desirable to establish some degree of time proximity of the contact with the suspected resource and the detection of a security incident that gave rise to the compromise. It is recognized that increasing the size of the time window will result in more mistakes—both an increase in false positives and false negatives (i.e., when a malicious resource is missed as being malicious). A time period that is too short will likely weaken the causal link between the communication and the security and result in more false negatives. In a similar manner, a higher threshold number of computers needed before suspicion is raised will result in fewer false positives but more false negatives. A lower number will have the opposite effect. As false positive alerts increase, more handling is required by the administrator. Thus, the particular balance chosen between accuracy and administrative workload may often be a matter of design choice.

With continuing reference to the message sequence chart, security assessments response asterisks 316 represent activities relating to determining/performing an appropriate response to security assessments 170 by specialized security products 301, 302, 303, and 304. Examples of responses include but are not limited to taking local action (such as scanning for malware), collecting forensic evidence, and/or generating and transmitting new security data 162.

Security assessment criteria 220 may be used to specify instructions for obtaining security assessments 170 via CCC 160, such as whether security assessments 170 are pushed to or pulled from a particular location, and security assessment criteria 220 may also be used to ascertain and/or implement an appropriate response to a security assessment received via CCC 160. It is generally desirable to identify an amount of time, such as a window of time, in which responses to security assessments 170 are performed. Outside of the window of time, normal operation of specialized security products generally resumes. One exemplary amount of time is a window of time based on (for example, beginning at) the time when a particular security assessment 170 was received.

One desirable response to various types of security assessments 170 is the collection of forensic evidence by devices within ECE 102 in local or remote information repositories. Generally, forensic evidence is collected within a certain window of time, such as the window of time beginning when a security assessment 170 is received until a predetermined end time (such as an hour). Examples of forensic evidence include but are not limited to: network traffic captures, hard disk data, transaction contents, more detailed logs such as firewall logs and audit logs associated with an operating system, and memory dumps. Such forensic evidence might have been unavailable to forensic investigators arriving days or weeks after the detection of the security incident because of the high cost of maintaining large amounts of data. That is, conventional static policies that are applied to the collection of forensic evidence usually specify that evidence is retained for relatively short periods of time using either a time-based policy (i.e., data is dumped from the evidence store after "X" hours, days weeks, etc. on a first-in-first-out ("FIFO") basis) or storage-based policy (i.e., data is dumped from a fixed size storage medium, file or partition of "Y" megabytes or gigabytes, etc. such as a disk or array on a FIFO basis). While application and formulation of such static policies typically vary according to industry and by specific customers, the costs of data retention can be high since the amount of data available for retention in most environments is generally vast.

Here, rather than rely on static policies for forensic evidence collection and retention, dynamic policies are implemented in the present arrangement that take into account the objects in the environment and the context that is provided by the shared security assessments. Objects in the environment include objects which are internal to the ECE 102 such as client computers, users, and network subnets (e.g., network branches, separate buildings in the ECE, etc.). Objects may also typically include those that are external to the ECE 102 including IP addresses and web site URIs, for example.

Typically, upon detecting a security incident, an SE will publish a security assessment into the CCC 160 that describes the incident, and the object to which it applies, along with severity, fidelity, TTL, etc. The detecting SE, if so capable, will begin collection of relevant forensic evidence that is associated with the object. Upon receiving the security assessment, those SEs that are capable of collecting forensic evidence will also start to do so. Generally, the starting time of the collection will coincide with the detection of the event, or receipt of the security assessment. In addition, any forensic evidence that may have relevance to the security incident that an SE may have already collected prior to the detection will be marked for retention so that it is not otherwise deleted through operation of normal policies.

The SEs that perform the forensic evidence collection will typically switch to some form of data collection that is more detailed than that routinely performed (i.e., in the absence of a security incident). Such detailed data collection may include, for example, more comprehensive event logging, collecting details regarding content of transactions in the environment (e.g., at the packet level), capturing network requests, and capturing network activities.

While such comprehensive forensic data collection puts some pressure on available resources in the environment, the dynamic policies use the context from the security assessment to identify specific objects of interest for which forensic evidence is collected and retained, and determine what kinds of evidence is collected, for how long it is collected, and the length of time it is retained. For example, forensic evidence relating to a particular object such as a computer that is suspected of being severely compromised by a rootkit may be kept longer than for other non-compromised objects, and all activities of that compromised object may be logged. By comparison, forensic evidence about an object for which there is no particular suspicion will be kept for shorter period of time, and perhaps only network activities are logged. The impact on the enterprise is therefore bounded and the forensic evidence that is collected has increased likelihood of being meaningful.

The fidelity, severity, or category of a security assessment pertaining to the object may be other criteria that are considered in a particular dynamic forensic evidence retention policy. For example, higher fidelity assessments may result in longer evidence retention as compared with other objects where the applicable security assessments have lower fidelity. Similarly, security assessments having high or critical severity may result in longer retention, or different types, or more extensive forensic evidence being collected.

The policies are dynamic to take into account that the security environment is itself subject to change. Reputations may change, new malware developed, web sites put up and taken down, etc. and the security assessments being shared in the ECE 102 are inherently structured to account for such changes. Therefore, for example, if a particular security assessment having low severity and low fidelity is received by an SE, in light of that SE's information about the object of interest, the SE may generate a new security assessment having high severity with high fidelity. The collection and retention policies for forensic evidence for the object of interest may be changed to reflect the new security assessment.

It is emphasized that the particular SE that detects a security incident about a particular object can be different than the SE which collects the forensic evidence about the object. For example, an SE that implements an anti-virus product might detect that an email contains some malicious code that infected a client computer. The anti-virus SE sends out a security assessment that is received by an SE that implements a firewall or perimeter security product which then begins to log more detailed activity by the infected computer in accordance with a policy that keeps the logged data on hand for a longer period of time than for objects that have not been compromised.

In the exemplary scenario of detecting a malware-compromised client computing device, security assessment(s) 170, identifying an attempt by a client computing device to access a resource deemed to be security incident, may trigger responses in several places. The infected client computing device may be manually or automatically scanned/cleaned, and firewall, anti-malware, intrusion detection/prevention, and reputation service products 301, 302, 303, and 304, respectively, may generate new security data 162 and/or take other action, such as collecting forensic evidence.

In the exemplary scenario of detecting a malicious presence on the Web or from an IP address, one or more security assessment(s) 170 that identify a malicious URI may trigger responses by one or more specialized security products. Firewall, anti-malware, intrusion detection/prevention, and reputation service products 301, 302, 303, and 304, respectively, may generate new security data 162 and/or take other action, such as collecting forensic evidence.

Figure 4:
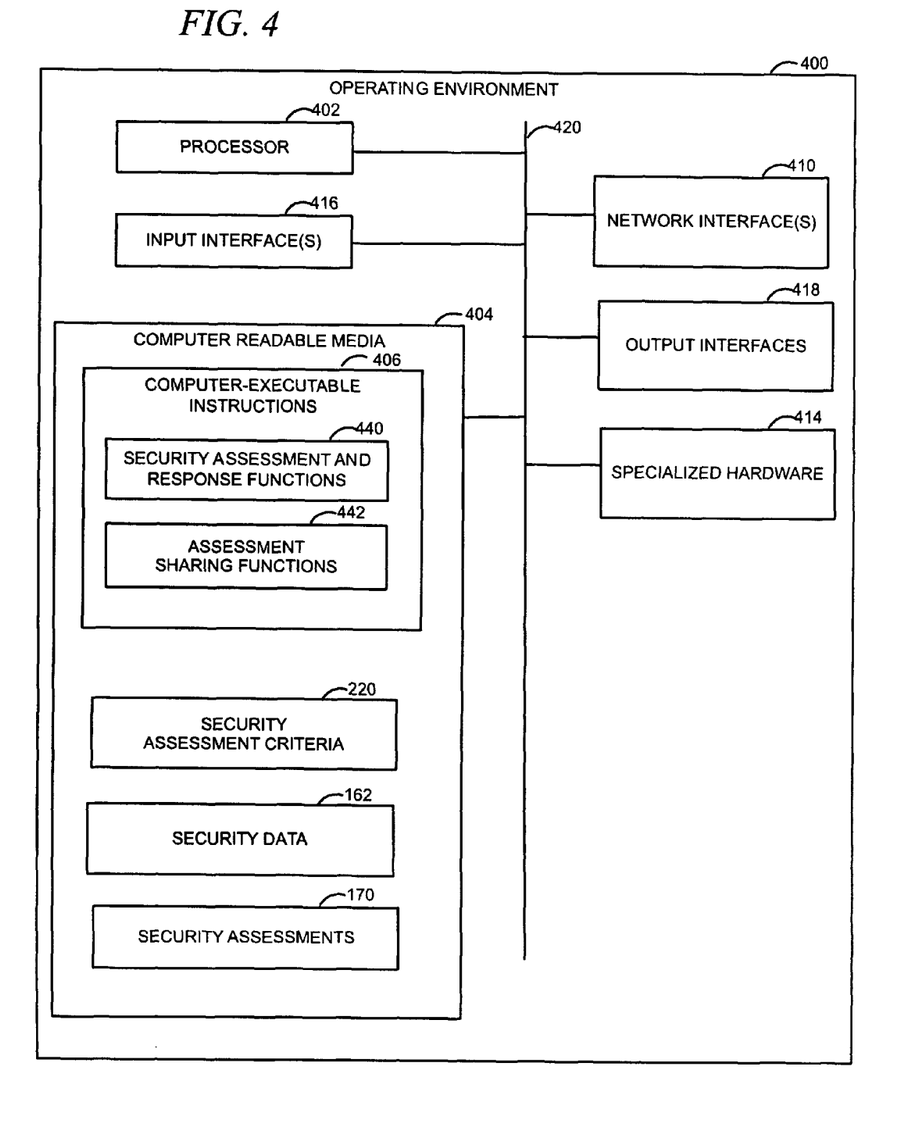
FIG. 4 is a simplified functional block diagram of an exemplary configuration of an operating environment in which the security assessment system shown in FIG. 2 may be implemented or used.

The method(s) illustrated via FIG. 3 may be implemented using computer-executable instructions executable by one or more general, multi-purpose, or single-purpose processors (exemplary computer-executable instructions 406 and processor 402 are discussed further below, in connection with FIG. 4). Unless specifically stated, the methods described herein are not constrained to a particular order or sequence. In addition, some of the described method(s) or steps thereof can occur or be performed concurrently. It will further be understood that all of the steps shown need not occur in performance of the functions described herein—the type, quantity, and implementation of specific messaging is a matter of implementation preference.

With continued reference to FIGS. 1-3, FIG. 4 is a block diagram of an exemplary configuration of an operating environment 400 (such as a client computing device or a server) in which all or part of SAS 101 and/or the methods shown and discussed in connection with FIG. 3 may be implemented or used. Operating environment 400 is generally indicative of a wide variety of general-purpose or special-purpose computing environments, and is not intended to suggest any limitation as to the scope of use or functionality of the system(s) and methods described herein.

As shown, the operating environment 400 includes processor 402, computer-readable media 404, and computer-executable instructions 406. One or more internal buses 420, which are widely available elements, may be used to carry data, addresses, control signals, and other information within, to, or from operating environment 400 or elements thereof.

Processor 402, which may be a real or a virtual processor, controls functions of operating environment 400 by executing computer-executable instructions 406. Processor 402 may execute instructions 406 at the assembly, compiled, or machine-level to perform a particular process.

Computer-readable media 404 represent any number and combination of local or remote devices, in any form, now known or later developed, capable of recording, storing, or transmitting computer-readable data, such as computer-executable instructions 406, security assessments 170, security assessment criteria 220, or security data 162. In particular, computer-readable media 404 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. Computer-readable media 404 may also include transmission media and data associated therewith. Examples of transmission media/data include, but are not limited to, data embodied in any form of wireline or wireless transmission, such as packetized or non-packetized data carried by a modulated carrier signal.

Computer-executable instructions 406 represent any signal processing methods or stored instructions. Generally, computer-executable instructions 406 are implemented as software components according to well-known practices for component-based software development, and encoded in computer-readable media (such as computer-readable media 404). Computer programs may be combined or distributed in various ways. Computer-executable instructions 406, however, are not limited to implementation by any specific embodiments of computer programs, and in other instances may be implemented by, or executed in, hardware, software, firmware, or any combination thereof.

As shown, certain computer-executable instructions 406 implement security assessment and response functions 440, which implement aspects of security assessment and response engine 240 (shown in FIG. 2); and certain computer-executable instructions 406 implement assessment sharing functions 442, which implement aspects of assessment sharing agent 242.

Input interface(s) 416 are physical or logical elements that facilitate receipt of input to operating environment 400. Input may be received using any type of now known or later-developed physical or logical elements, such as user interfaces, remote controls, displays, mice, pens, styluses, trackballs, keyboards, microphones, scanning devices, and all types of devices that are used to input data.

Output interface(s) 418 are physical or logical elements that facilitate provisioning of output from operating environment 400. Output may be provided using any type of now known or later-developed physical or logical elements, such as user interfaces, displays, printers, speakers, disk drives, and the like.

Network interface(s) 210 represent one or more physical or logical elements, such as connectivity devices or computer-executable instructions that enable communication by operating environment 400 via one or more protocols or techniques (such as via CCC 160). Information received at a given network interface may traverse one or more of the seven vertical layers of the OSI Internetworking Model (or any other applicable communication protocol model).

Specialized hardware 414 represents any hardware or firmware that implements functions of operating environment 400. Examples of specialized communication hardware 414 include encoder/decoders ("CODECs"), application-specific integrated circuits, and the like.

It will be appreciated that particular configurations of operating environment 400 or SAS 101 may include fewer, more, or different components or functions than those described. In addition, functional components of operating environment 400 or SAS 101 may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. An automated method for collecting and retaining forensic evidence that is applicable to a security incident that occurs in an enterprise networking environment, the method comprising the steps of:

arranging the enterprise networking environment so that each of a plurality of endpoints in the enterprise networking environment collects and communicates security assessments over a communication channel, each of the security assessments being arranged for describing an object in the enterprise networking environment, and each of the plurality of endpoints being configured for receiving security assessments published by other endpoints and each of the plurality of endpoints being further configured for generating a new security assessment, in response to a received security assessment, using information that is locally-available to one of the plurality of endpoints performing the generating, wherein the received security assessment is arranged to provide contextual meaning to the security incident and further being defined with a fidelity to describe a degree of confidence in reliability of the detected security incident, or with a severity to describe a degree of seriousness for the security incident;

invoking a mode for forensic evidence collecting, by at least one of the plurality of endpoints, in response to a security assessment of a detected security incident by which the object in the enterprise network environment becomes compromised;

invoking a mode for retaining the collected forensic evidence; and applying dynamic policies to the forensic evidence collecting and retaining so that the collecting and retaining will use different modes for different objects.

2. The automated method of claim 1 in which the applying of dynamic policies will result in forensic evidence associated with a compromised object being retained for a longer period of time than for a non-compromised object.

3. The automated method of claim 1 in which the object is one of host computer, user, IP address, URI, or network subnet in the enterprise networking environment.

4. The automated method of claim 1 in which the forensic evidence collecting and retaining is dependent upon the fidelity.

5. The automated method of claim 1 in which the forensic evidence collecting and retaining is dependent upon the severity.

6. The automated method of claim 1 in which the mode of collecting is dependent upon the type of endpoint that is performing the collecting.

7. The automated method of claim 1 in which the forensic evidence collecting comprises a mode for comprehensive data collection.

8. The automated method of claim 7 in which the mode for comprehensive data collection comprises collecting forensic evidence from a plurality of sources, the sources including network traffic captures, hard disk data images, memory dumps, firewall log, or operational system audit logs.

9. The automated method of claim 1 in which the forensic evidence collecting comprises a mode for detailed data collection.

10. The automated method of claim 9 in which the mode for detailed data collection comprises one of collecting details from logs, examining contents of transactions, examining requests for network connectivity, or capturing network packets.

11. The automated method of claim 1 including a further step of marking for retention forensic evidence associated with a compromised object that was collected prior to the detected security incident.

12. The automated method of claim 1 in which the dynamic policies are varied responsively to new security assessments that are generated by the endpoints.

13. The automated method of claim 1 in which the endpoints comprise different security products.

14. A method for presenting forensic evidence pertaining to a security incident occurring in an enterprise network that includes a plurality of endpoints which are arranged to share security assessments over a common communication channel, the method comprising the steps of:

receiving a security assessment at an endpoint in the enterprise network that is arranged for centralized logging and auditing of security assessments produced by the plurality of endpoints, the security assessment indicating a suspected compromised object, environment, and each of the plurality of endpoints being configured for receiving security assessments published by other endpoints and each of the plurality of endpoints being further configured for generating a new security assessment, in response to a received security assessment, using information that is locally-available to one of the plurality of endpoints performing the generating, wherein the received security assessment is arranged to provide contextual meaning to the security incident and further being defined with a fidelity to describe a degree of confidence in reliability of the detected security incident, or with a severity to describe a degree of seriousness for the security incident; and providing a presentation of forensic evidence associated with the suspected compromised object, the forensic evidence being collected by endpoints in the enterprise network in accordance with dynamic policies that vary by object and by criteria expressed in the security assessment.

15. The method of claim 14 in which the criteria include security assessment fidelity and security assessment severity.

16. The method of claim 14 in which the object is one of host computer, user, IP address, URI, or network subnet in the enterprise network.

17. A method for retaining forensic evidence associated with a compromised object in an enterprise network environment, the method comprising the steps of:

arranging the enterprise network environment so that each of a plurality of endpoints in the enterprise network environment communicates security assessments over a communication channel, each of the security assessments being arranged for describing an object in the enterprise network environment that is suspected of being compromised or malicious, and each of the plurality of endpoints being configured for receiving security assessments published by other endpoints and each of the plurality of endpoints being further configured for generating a new security assessment, in response to a received security assessment, using information that is locally-available to one of the plurality of endpoints performing the generating, wherein the received security assessment is arranged to provide contextual meaning to the security incident and further being defined with a fidelity to describe a degree of confidence in reliability of the detected security incident, or with a severity to describe a degree of seriousness for the security incident; and retaining the forensic evidence associated with the object in accordance with dynamic forensic evidence collection policies, the dynamic forensic evidence collection policies being dependent on criteria specified in each of the security assessments in which the criteria use a predefined taxonomy having a schematized vocabulary comprising object types and assessment categories.

18. The method of claim 17 in which the object is one of host computer, user, IP address, URI, or network subnet in the enterprise network.

* * * * *